United States Patent
Kubsch et al.

[11] Patent Number: 5,230,467
[45] Date of Patent: Jul. 27, 1993

[54] CONTROL DISPLAY DEVICE FOR AN AIR-CONDITIONING SYSTEM OF A MOTOR VEHICLE

[75] Inventors: Erich Kubsch, Weil der Stadt; Karl-Heinz Weller, Gerlingen, both of Fed. Rep. of Germany

[73] Assignee: Mercedes-Benz AG, Fed. Rep. of Germany

[21] Appl. No.: 810,423

[22] Filed: Dec. 20, 1991

[30] Foreign Application Priority Data

Dec. 21, 1990 [DE] Fed. Rep. of Germany ....... 4041193

[51] Int. Cl.⁵ ............................................. G05D 23/00
[52] U.S. Cl. ........................................ 236/94; 62/127; 62/163; 62/244
[58] Field of Search ............... 62/125, 126, 127, 129, 62/130, 244, 161, 163, 164; 165/11.1; 236/94; 454/75; 340/524, 525, 716, 718

[56] References Cited

U.S. PATENT DOCUMENTS

| | | | |
|---|---|---|---|
| 3,954,363 | 5/1976 | Hunyar | 425/157 |
| 4,827,730 | 5/1989 | Doi et al. | 165/11.1 X |
| 4,909,043 | 3/1990 | Masauji et al. | 62/228.5 X |

FOREIGN PATENT DOCUMENTS

| | | |
|---|---|---|
| 0050331 | 4/1982 | European Pat. Off. |
| 0115178 | 8/1984 | European Pat. Off. |
| 2808702 | 5/1984 | Fed. Rep. of Germany |
| 3445235 | 6/1988 | Fed. Rep. of Germany |

Primary Examiner—Harry B. Tanner
Attorney, Agent, or Firm—Evenson, McKeown, Edwards & Lenahan

[57] ABSTRACT

An operating display device for an automotive air-conditioning system having an automatic operating mode which can be partially overridden by manual control of selected functions. A visual display provides a symbolic indication of the status of functions selected by said automatic operating mode as well as the status selected by manual control of such functions.

5 Claims, 1 Drawing Sheet

CONTROL DISPLAY DEVICE FOR AN AIR-CONDITIONING SYSTEM OF A MOTOR VEHICLE

BACKGROUND AND SUMMARY OF THE INVENTION

The invention relates to a control display device for an air-conditioning system of a motor vehicle of the type having an automatic mode, with provision for manual override actuated by a series of function keys.

A device of this kind is disclosed in German patent document DE 34 45 235 C2, in which in automatic operation only the desired temperature value set via keys is indicated on the display as a control function. In addition, control functions of the air-conditioning system can be at least partially manually overridden in automatic operation, by means of permanently assigned function keys, the selected override function being visually indicated in addition to the function key, by means of symbols and LEDs. In this case, it is considered disadvantageous that the operator cannot determine which control mode the air-conditioning system is in at any particular moment during fully automatic operation, and thus individual overriding of at least one function occurs to a greater or lesser extent only intuitively.

Furthermore, a display and control device for a ventilation, heating and cooling system for a motor vehicle is disclosed in German patent document DE 28 08 702 C2 in which it can be indicated on a control panel by means of illuminating symbols which mode, set manually and individually on a temperature switch, blower switch and cooler switch, is effective in the vehicle after actuation of further air distribution switches. An automatic air-conditioning control by means of a separate AUTO-key is not provided here.

The object of the invention, therefore, is to construct an air-conditioning operating device of the generic type in which selective overriding of the automatic operation by means of permanently assigned functions is made substantially easier for the operator.

Other objects, advantages and novel features of the present invention will become apparent from the following detailed description of the invention when considered in conjunction with the accompanying drawings.

DETAILED DESCRIPTION OF THE DRAWINGS

Figure 1:
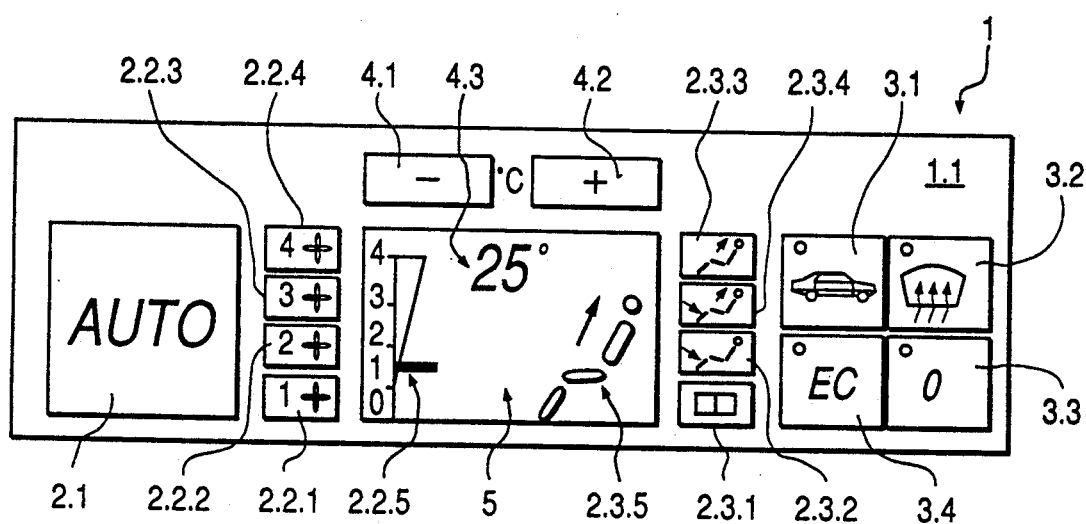
FIG. 1 shows a diagrammatic illustration of the front of a control display device according to the invention, in the automatic operation mode.

The control display device 8 illustrated in the figures has on its front 1.1 a plurality of push-button keys, including an "AUTO" key 2.1 assigned to automatic operation, as well as a plurality of permanently assigned function keys 2.2.1 to 2.2.4 for the amount of air (blower speed) and permanently assigned function keys 2.3.1 to 2.3.4 for the distribution of air in the vehicle. While control functions of the air-conditioning system can be overridden in automatic operation by means of the permanently assigned function keys, automatic operation can be completely switched off with further push-button keys 3.1 to 3.4 such as for air circulation, defrosting, economy, off. The corresponding function is carried out. In addition, two further push-button keys 4.1 and 4.2 are provided to set a desired temperature 4.3 (for example 25° C.) as a control function for automatic operation, as indicated on a display 5.

As shown in FIG. 1, if the "AUTO" push-button key 2.1 is actuated (which is symbolized by the push-button key outlined with a corresponding thickness of lines), that is to say, the air-conditioning system is switched to automatic operation, in addition to the temperature control function (desired temperature value 4.3), the current control functions relating to air flow 2.2.5 and air distribution 2.3.5 are also symbolically indicated on the display 5. Thus, the operator continuously has up-to-date information relating to the status of the internal control of the air-conditioning system currently running.

Figure 2:
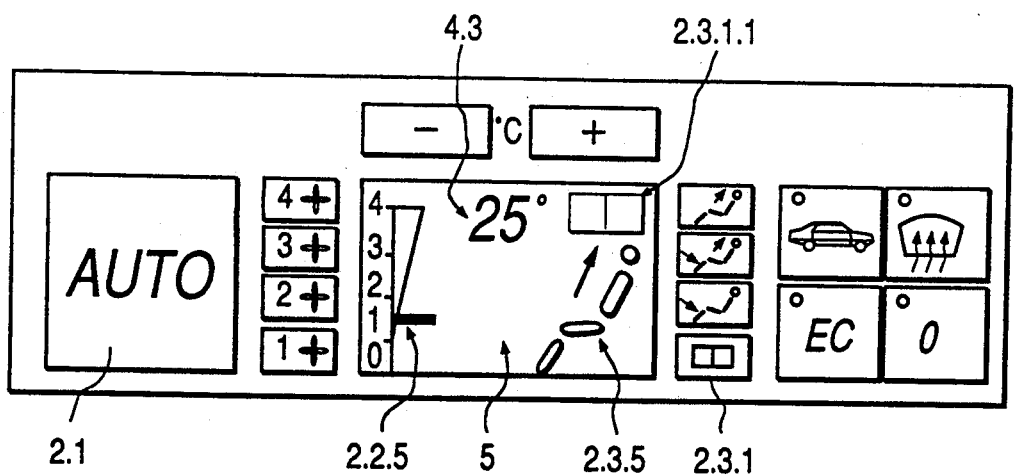
FIG. 2 shows the operating device of FIG. 1 in automatic operation, but with an overridden control function.

If the operator would now like to carry out, for example, an air distribution, "air out of the swivellable air inlets only", he can determine the current air distribution of the automatic operation by looking at the display 5, and if the displayed air distribution 2.3.5 (for example that shown in FIG. 1, "air to the windscreen") does not correspond to the desired air distribution, by actuating the permanently assigned function key 2.3.1 (see FIG. 2) the current control function of the automatic operating mode "air distribution to the windscreen" can be overridden by the override function "air out of the swivellable air inlets only".

In order to now indicate to the operator that a control function has been overridden in automatic operation by a permanently assigned function, the override function 2.3.1.1 can also be symbolically displayed on the display 5, either at another location on the display in addition to the overridden control function 2.3.5, or at the point of the previously displayed control function 2.3.5 which is now faded out. In addition, it is possible to retain the display of the overridden control function 2.3.5 and additionally to indicate visually activation of the override function by illuminating the permanently assigned function key 2.3.1.

Analogously, the displays can also be controlled on actuating one of the push-button keys 3.1 to 3.4.

By virtue of the fact that the internal technical control processes of the air-conditioning system are displayed to the operator in automatic operation on a display on the operating device, the operator receives accurate information which makes it substantially easier for him to influence the automatic operating mode by permanently assigned functions.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Operating display device for an air conditioning system of a motor vehicle, comprising:
   a plurality of push button keys;
   at least one of said keys being an automatic operation key operable to place said air conditioning system in an automatic operating mode wherein operating status of functions of said air-conditioning system, including at least one of: temperature, air flow and air distribution, are selected by said air-conditioning system;

others of said push button keys being permanently assigned function keys individually operable to at least partially override said automatic operation mode by manually selecting a desired operating status for at least one of said functions and placing said air-conditioning system in said desired operating status;

display means, operative at least when said air-conditioning system is in said automatic mode, for displaying a visual indication of an adjustable desired temperature setting for said air-conditioning system, current operating status of functions of said air-conditioning system selected by operation of said function keys, and current operating status of functions of said air-conditioning system which are automatically selected by said air-conditioning system in said automatic operating mode.

2. Operating display device according to claim 1 wherein, when said air-conditioning system is in said automatic operating mode and when the permanently assigned function key is actuated, a manually selected operating status of said at least one function is visually displayed in addition to an operating status of said at least one function selected by said automatic operating mode.

3. Operating display device according to claim 1 wherein, when said air-conditioning system is in said automatic operating mode and when a permanently assigned function key is actuated, a manually selected operating status of said at least one function is visually displayed, and an operating status of said at least one function selected by said automatic operating mode is faded out.

4. Operating display device according to claim 1 wherein, when said air-conditioning system is in said automatic operating mode and a permanently assigned function key is actuated, both said automatically selected status and manually selected status of said at least one function are displayed.

5. Operating display device according to claim 4, wherein the manually selected status of said at least one function is displayed at a point of the display different from that of the automatically selected status of said function.

* * * * *